United States Patent
Tully et al.

(10) Patent No.: US 6,616,980 B2
(45) Date of Patent: Sep. 9, 2003

(54) EMULSION POLYMERIZED ACRYLATED SILICONE COPOLYMER FOR WRINKLE REDUCTION

(75) Inventors: Jo Anne Tully, Mahopac, NY (US); Emie M. Silvestre, Yonkers, NY (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 10/123,341

(22) Filed: Apr. 15, 2002

(65) Prior Publication Data

US 2003/0068442 A1 Apr. 10, 2003

Related U.S. Application Data

(60) Provisional application No. 60/286,385, filed on Apr. 24, 2001.

(51) Int. Cl.$^7$ ................................................. B05D 3/02
(52) U.S. Cl. ..................... 427/387; 427/393.2; 427/394
(58) Field of Search ............................... 427/387, 389.9, 427/393.2, 394

(56) References Cited

U.S. PATENT DOCUMENTS

| | | | |
|---|---|---|---|
| 3,714,287 A | 1/1973 | Compbell et al. | 260/826 |
| 4,153,640 A | 5/1979 | Deiner et al. | 260/827 |
| 4,464,506 A | 8/1984 | Alberts et al. | 524/588 |
| 4,987,180 A | 1/1991 | Ohata et al. | 524/860 |
| 5,084,489 A | 1/1992 | Liles | 522/84 |
| 5,171,638 A | 12/1992 | Ozaki et al. | 428/447 |
| 5,300,237 A | 4/1994 | Ona et al. | 252/8.6 |
| 5,300,241 A | 4/1994 | Mikami et al. | 252/8.8 |
| 5,532,023 A | 7/1996 | Vogel et al. | 427/8 |
| 5,612,433 A | 3/1997 | Ono et al. | 526/279 |
| 5,635,546 A | 6/1997 | Rich et al. | 523/176 |
| 5,798,107 A | 8/1998 | Vogel et al. | 424/400 |
| 5,968,404 A | 10/1999 | Trinh et al. | 252/8.91 |
| 6,001,343 A | 12/1999 | Trinh et al. | 424/76.4 |
| 6,201,093 B1 | 3/2001 | Messner et al. | 528/28 |
| 6,207,782 B1 | 3/2001 | Czech et al. | 528/26 |

FOREIGN PATENT DOCUMENTS

| | | |
|---|---|---|
| EP | 930342 A2 | 7/1999 |
| JP | 01168972 A2 | 9/1989 |
| JP | 02191772 A2 | 7/1990 |
| JP | 02210073 A2 | 8/1990 |
| JP | 08109580 A2 | 4/1996 |
| JP | 09217282 A2 | 8/1997 |
| JP | 2003-155667 A2 * | 5/2003 |
| WO | 9955951 | 11/1999 |
| WO | 9955952 | 11/1999 |
| WO | 9955953 A1 | 11/1999 |
| WO | 2000008249 A1 | 2/2000 |

\* cited by examiner

*Primary Examiner*—Erma Cameron
(74) *Attorney, Agent, or Firm*—Michael P. Dilworth

(57) ABSTRACT

A method of reducing wrinkles in fabric is disclosed wherein the method comprises the steps of:

A) forming a coating of a carrier and a polymer on a fabric surface, wherein the polymer comprises a polymerized acrylated or methacrylated siloxane having a general formula:

$$\{R_3SiO_{1/2}\}_m\{O_{1/2}Si(R_2)O_{1/2}\}_n\{SiO_{3/2}R\}_o\{SiO_{4/2}\}_p$$

wherein

R is selected from $R^1$ and P;

each $R^1$, which can be the same of different, is a monovalent hydrocarbon group;

each P is $R^3[(C_bH_{2b}O)_zCOCR^4\!=\!CH_2]_g$;

$R^3$ is a polyvalent organic moiety;

g is a valency of $R^3$;

$R^4$ is hydrogen or methyl;

b is 2 to 4;

z is 1 to 1000;

m+n+p+o is equal to 1 to 100;

at least one R is P;

n is 1 to 100;

n/o is less than 10:1;

n/p is less than 10:1;

and m is 0 to 10;

B) smoothing the fabric surface; and

C) removing the carrier from the fabric surface.

11 Claims, No Drawings

EMULSION POLYMERIZED ACRYLATED SILICONE COPOLYMER FOR WRINKLE REDUCTION

I claim the benefit under Title 35, United States Code, §120 to U.S. Provisional Application No. 60/286,385 filed Apr. 24, 2001, entitled EMULSION POLYMERIZED ACRYLATED SILICONE COPOLYMER FOR WRINKLE REDUCTION.

BACKGROUND OF THE INVENTION

1. Field of the Invention

The present invention relates to the use of an emulsion polymerized acrylated polyether modified polydimethylsiloxane as a wrinkle reducing additive for aqueous and non-aqueous based formulations useful for fabric care applications. More specifically, these acrylated silicones form a stable silicone-in-water emulsion that contains a highly cross-linked matrix, which, when spray applied to fabric substrates, releases wrinkles and deposits a continuous film. This film, upon drying, prevents wrinkles from reforming and improves tactile properties.

2. Description of Related Art

Emulsions of polymers derived from hydrophilic acrylated siloxanes offer important properties, such as hydrophilicity and rewettability, while maintaining other "silicone" characteristics, such as improved aesthetics and tactile properties.

U.S. Pat. No. 3,714,287 discloses that the removal of stains during laundering of organic textiles is facilitated and superior hand is imparted in the fabric by applying thereto a combination of from 10 to 99 percent by weight of a polymethylsiloxane and from 1 to 90 percent by weight of a polymeric, unsaturated, water-soluble carboxylic acid. This composition is said to work especially well in combination with aminoplast crease resistance textile resins. A typical formulation is 45 percent by weight of dihydroxyl dimethylolethylene urea resin, 27.5 percent by weight of a polydimethylsiloxane of 50,000 cs. viscosity and 27.5 percent by weight of polymethacrylic acid.

U.S. Pat. No. 4,153,640 discloses a process for the production of modified polymers, preferably in organic solvents, by radical-initiated polymerization of (Ia) 70 to 99.9 parts by weight of esters of the formula $CH_2=C(R)-COOR'$(Ia) in which R is $-H$ or $-CH_3$ and R' are 1 to 18 C-alkyl radicals, at least 50% by weight of the esters of (Ia) being those in which R' are 1 to 4 C-alkyl radicals, (Ib) 0.1 to 20 parts by weight of ω-hydroxyalkyl esters of acrylic, methacrylic, maleic and/or fumaric esters, the said dicarboxylic acids are possibly etherified on the second carboxylic group with 1 to 12 C-atoms containing alcohols and (Ic) 0 to 10 parts by weight of other unsaturated monomers, the sum of (Ia), (Ib) and (Ic) amounting to 100 parts by weight, in the presence of (II) 5 to 40 parts by weight of terminal blocked alkyl-hydrogen polysiloxanes, the alkyl radicals containing 1 to 4 carbon atoms, with a viscosity of 20 to 1000 cP at 20° C., the ratio of alkyl radicals to hydrogen atoms thereof being from 13:1 to 1:1, in which ratios the terminal groups are not included. Organic solvents containing the obtained modified polymers and usual curing agents for alkyl-hydrogen polysiloxanes are said to be useful for treating fibrous material to give water-tight and water-repellent effects.

U.S. Pat. No. 4,464,506 discloses a graft polymer dispersion suitable for finishing textiles and comprising water, a dispersing auxiliary and a polymeric product produced by subjecting to free radical polymerization a composition comprising (A) an organopolysiloxane containing vinyl groups,
(B) an organopolysiloxane containing Si—H groups, and
(C) a polymerizable vinyl monomer, some of the organopolysiloxane components being linked via polymerized units of the vinyl monomer and some of the Si—H groups of the Si—H-organopolysiloxane being modified by mono-addition of the vinyl monomer.

U.S. Pat. No. 4,987,180 discloses that softness and elastic resilience can be imparted to a fabric material treated with a fabric finishing agent that is an aqueous emulsion of a copolymer obtained by the emulsion polymerization, in an aqueous emulsion of an organopolysiloxane having radical-polymerizable groups, e.g., vinyl groups, or mercapto-substituted hydrocarbon groups, e.g., 3-mercaptopropyl groups, as the polymerization medium of an acrylic or methacrylic monomer, e.g., alkyl acrylates and methacrylates, in a specified amount relative to the amount of the organopolysiloxane. The acrylic or methacrylic monomer may be partly replaced with a polyfunctional monomer, e.g., acrylic and methacrylic acids, N-methylol acrylamide, glycidyl methacrylate, 2-hydroxyethyl methacrylate and the like, and/or a monomer of the third class, e.g., styrene and acrylonitrile. The emulsion may be further admixed with an organohydrogen polysiloxane as a crosslinking agent and a catalyst for the crosslinking reaction.

U.S. Pat. No. 5,084,489 discloses a silicone emulsion prepared by emulsion polymerizing a hydroxyl endblocked polydiorganosiloxane oligomer with a combination of a siloxane or siloxane precursor containing unsaturated hydrocarbon groups and a functional silicone selected from the group consisting of organosilicon hydrides and mercaptoalkylsilanes or siloxanes, or with an acryl or methacryl functional siloxane. When the emulsion of the copolymer produced is combined with a photoinitiator, the copolymer can be crosslinked by exposure to ultraviolet radiation. When the water is removed, an elastomer results. The emulsion can be used to produce coatings and sealants.

U.S. Pat. No. 5,171,638 discloses an organopolysiloxane/acrylate ester copolymer emulsion composition prepared by forming a water-based emulsion of an alkenyl-containing organopolysiloxane containing no more than 5,000 parts per million of organosiloxane oligomer which has ≦20 silicon atoms in its molecule and copolymerizing the emulsion with an acrylate ester monomer.

U.S. Pat. No. 5,300,237 discloses reacting amino groups of an organopolysiloxane with an acrylic acid or ester compound to provide a fiber-treating composition that is said to be almost completely free of yellowing while having excellent softness and smoothness.

U.S. Pat. No. 5,300,241 discloses a polyester-fiber-treatment agent that can impart smoothness and flexibility to polyester fiber at the same time that it also equips the polyester fiber with nonflammability. The treatment agent for the polyester fiber is based on an organosilicon compound that contains an organic group comprising a bromine-containing organic group bonded to silicon via carbon where the organosilicon compound has a bromine content of at least 5 weight percent.

U.S. Pat. Nos. 5,532,023 and 5,798,107 disclose a wrinkle reducing composition for use on fabrics, particularly clothing. The composition comprises a wrinkle reducing active, which is made up of an effective amount of silicone and an effective amount of film-forming polymer, and a liquid carrier. The composition is substantially free of starch, modified starch, and mixtures thereof, and results in a Loss Modulus Difference of greater than about 3.3×10$^7$ Pascal on fabric. The composition can be incorporated into a spray dispenser that can create an article of manufacture that can facilitate treatment of fabric with the wrinkle reducing composition. The wrinkle reducing actives in the composition can be determined through Dynamic Mechanical Analysis using a 100% cotton broadcloth swatch and a fixed volume of a sample of wrinkle reducing active.

U.S. Pat. No. 5,612,433 describes a water repellent for fibers, comprising an acrylsilicone graft copolymer that is prepared by a radical copolymerization reaction of an organopolysiloxane compound containing one radical polymerizable group with radical polymerizable monomers including an acrylate, a methacrylate or a mixture thereof as a main member.

Acrylated polysiloxanes copolymerized with organic acrylates and emulsions thereof are known wherein the siloxane and acrylate have been applied to a substrate and are polymerized directly onto a surface. For example, U.S. Pat. No. 5,635,546 discloses a curable composition, having utility for threadlocking engageable members of a threaded mechanical fastener, comprising: a reactive silicone (meth) acrylate emulsified in an aqueous medium, optionally further comprising a polymerizable non-silicone (meth)acrylate monomer or oligomer; and a microencapsulated peroxy initiator which is initiatingly effective for cure of the reactive silicone (meth)acrylate. The curable composition may be usefully employed for adhesively bonding engageable structural parts, by applying the aqueous emulsion of the reactive silicone (meth)acrylate, containing a microencapsulated peroxy initiator, to at least a portion of an engagement surface of a matable part that is matably engageable with a complimentary engagement structure, to yield an emulsion-coated engagement surface, drying the emulsion-coated engagement surface to form a dried coating thereon; and thereafter engaging the surface having the dried coating thereon, with the complimentary engagement structure, to release the microencapsulated peroxy initiator and bond the matable part and complimentary engagement structure.

U.S. Pat. Nos. 5,968,404 and 6,001,343 disclose a stable, aqueous odor-absorbing and wrinkle controlling composition, preferably for use on inanimate surfaces, especially fabrics. The composition comprises from about 0.1% to about 20%, by weight of the composition, of solubilized, water-soluble, uncomplexed cyclodextrin and an effective amount of at least one ingredient to improve the performance of the composition selected from the group consisting of (1) cyclodextrin compatible surfactant; (2) cyclodextrin compatible antimicrobial active; and (3) mixtures thereof The composition also comprises a wrinkle control agent which is fabric lubricant, shape retention polymer, hydrophilic plasticizer, lithium salt, or mixtures thereof Hydrophilic perfume improves acceptance. Optionally, the composition can contain low molecular weight polyols; metallic salts to help control odor; a humectant, etc. The composition is essentially free of any material that would soil or stain fabric. The composition is preferably applied as small particle size droplets, especially from spray containers. The cyclodextrin/surfactant combination, either alone, or in combination with the other ingredients, is said to provide improved antimicrobial activity.

U.S. Pat. No. 6,201,093 discloses water-soluble, i.e., easily dispersible, amino-functional polyorganosiloxanes obtained by radical polymerization of vinyl compounds containing amino or ammonium groups onto polyorganosiloxanes which contain at least one mercapto group. They are said to be suitable as textile finishing aids, surfactants and emulsifiers.

U.S. Pat. No. 6,207,782 discloses emulsions and dispersions of polymers formed from acrylated hydrophilic polysiloxanes and their copolymers with acrylate/methacrylate comonomers wherein the polymer is formed in a solvent via radically catalyzed polymerization. Such a polymer is said to have utility in personal care applications, as well as textile finishes and coating formulations.

WO 2000008249 discloses wrinkle reducing compositions that comprise an adhesive block or graft silicone polymer, water, and ≦5% if a solubilizing agent, such as an anionic and/or nonionic surfactant.

JP 09217282 A2 discloses graft organosiloxane conditioners that are obtained by grafting alkyl (meth)acrylate esters, unsaturated carboxylic acids, and other vinyl compounds on organosiloxane compounds in aqueous emulsion. Polymerizing vinylphenylmethyldimethoxysilane with octamethylcyclotetrasiloxane in aqueous dispersion and grafting the resulting organosiloxane with acrylic acid, butyl acrylate, methyl methacrylate, and styrene gave a polymer emulsion said to be useful as a fabric conditioner.

The disclosures of the foregoing are incorporated herein by reference in their entirety

SUMMARY OF THE INVENTION

The present invention relates to the use of an emulsion polymerized acrylated polyether modified polydimethylsiloxane as a wrinkle reducing additive for aqueous and non-aqueous based formulations useful for fabric care applications.

More particularly, the present invention is directed to a method of reducing wrinkles in fabric comprising the steps of A) forming a coating of a carrier and a polymer on a fabric surface, wherein the polymer comprises a polymerized acrylated or methacrylated siloxane having a general formula:

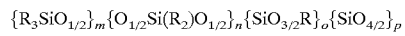

wherein
R is selected from R$^1$ and P;
each R$^1$, which can be the same of different, is a monovalent hydrocarbon group;
each P is R$^3$[(C$_b$H$_{2b}$O)$_z$COCR$^4$=CH$_2$]$_g$;

$R^3$ is a polyvalent organic moiety;

g is a valency of $R^3$;

$R^4$ is hydrogen or methyl;

b is 2 to 4;

z is 1 to 1000;

m+n+p+o is equal to 1 to 100;

at least one R is P;

n is 1 to 100;

n/o is less than 10:1;

n/p is less than 10:1;

and m is 0 to 10;

B) smoothing the fabric surface; and

C) removing the carrier from the fabric surface.

DESCRIPTION OF THE PREFERRED EMBODIMENTS

The present invention utilizes radically polymerized acrylates/methacrylates of polyether modified polysiloxanes and their copolymers with organic acrylates, as well as emulsions including these polymers. The siloxanes have siloxane backbones with pendant polyether functionality which polyethers are encapped with an acrylate or methacrylate functionality. The backbone may be linear, branched, or cyclic. These acrylated siloxanes then are polymerized in a solvent to form an emulsion of the latex.

The acrylated or methacrylated siloxanes can be represented by the formula:

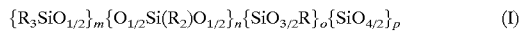
$$\{R_3SiO_{1/2}\}_m\{O_{1/2}Si(R_2)O_{1/2}\}_n\{SiO_{3/2}R\}_o\{SiO_{4/2}\}_p \qquad (I)$$

wherein R is selected from $R^1$ and P wherein each $R^1$ can be the same or different and each is a monovalent hydrocarbon group, each P is $R^3\{(C_bH_{2b}O)_zCOCR^4=CH_2\}_g$ and $R^3$ is a polyvalent organic moiety which may be a hydroxy substituted alkylene; g is a valency of $R^3$; $R^4$ is hydrogen or methyl; b is 2 to 4, preferably, 2 to 3; z is 1 to 1000, preferably 3 to 30; and m+n+p+o is equal to 1 to 100, preferably 2 to 20; at least one R is P; n is 1 to 100; n/o is less than 10:1; n/p is less than 10:1; and m is 0 to 10.

Preferably the acrylated or methacrylated siloxane is of the formula:

$$QR^1{}_2Si\{OSiR^1{}_2\}_x\{O\text{—}SiR^1P\}_yOSiR^1{}_2Q \qquad (II)$$

wherein x and y can be 0 or an integer, preferably each x and y are from 0 to 100, most preferably 0 to 25; Q can be $R^1$ or P, with the proviso that the average acrylate functionality is >1 unsaturated group per molecule. In a preferred embodiment, y is 0 and Q is P.

Preferably, R is a $C_1$–$C_4$ alkyl, aryl, or alkaryl, e.g., methyl, ethyl, propyl, isopropyl, butyl, isobutyl, sec-butyl, tert-butyl, phenyl, naphthyl, tolyl, xylyl, ethyl phenyl, and the like. More preferably, R is methyl, ethyl, phenyl, or ethyl phenyl. R may preferably include heteroatom substituents that are nonreactive with acrylates.

P can be branched with several polyether branches originating from the alkyl bridge to the silicon atom. For example, P can be an alkoxylated trimethylol propane monoallyl ether that has been hydrosilated onto the siloxane backbone and esterified. Other polyvalent precursors for P, which can be hydrosilated, alkoxylated, and esterified are glycerol monoallyl ether, pentaerythritol allyl ether, trisopropanol amine allyl ether, and the like. In a preferred embodiment, g is 1 and $R^3$ is a linear $C_2$–$C_5$ alkylene, e.g., methylene, ethylene, propylene, butylene, pentylene, and isomers of the foregoint, most preferably $C_2$–$C_3$, e.g., ethylene, propylene, and isopropylene.

Not all polyethers in P need be the same. Preferable P structures have ethylene oxide (b=2) contents of greater than 80% by weight of the alkylene oxide ($C_bH_{2b}O$) content. More preferably, all of the alkylene oxide chain is ethylene oxide.

The acrylates of Formula I are derived from the polyether polysiloxane copolymers wherein the polyethers are attached to the siloxane backbone through a non-hydrolyzable Si—C bond. Moreover, the polyethers should be uncapped so that the hydroxyl group can be (trans) esterified with the acrylate. These polyether polysiloxanes are commercially available.

The esterification is catalyzed with a Brønsted acid if the acid is the starting acrylate. If an ester is used, an acid or base can be used to catalyze the transesterification.

The acrylated silicone copolymers are polymerized to form polymers (latexes), or if desired, copolymers of Formula I with other comonomers (e.g., other esters). The polymerization can be conducted in various solvents, catalysts, and temperatures as are known in the art for polymerizing acrylates. The polymerization should not be conducted on a surface to form a film. Rather, polymerization in a solvent permits production of a crosslinked latex gel that has broader utility than film forming. The emulsion can contain up to 90 wt %, preferably less than 50 wt %, of the polymer in solvent. Suitable solvents include polar solvents, e.g., water and alcohol, and non-polar solvents, such as many hydrocarbons or low molecular weight cyclic or linear polydimethylsiloxanes. Preferably, such polydimethylsiloxanes should have a viscosity of less than 100 cSt at 25° C.

Any organic acrylate or methacrylate can be employed in forming the copolymers with the compound of Formula I. Thus, for example, acrylic acid and methacrylic acid or their derivatives, such as esters, nitriles, and amides, can be employed. The esters are preferred. Specific examples of the acrylates that can be utilized include methyl acrylate, ethyl acrylate, butyl acrylate, amyl acrylate, 2-ethylhexyl acrylate, cyclohexyl acrylate, vinyl acrylate, allyl acrylate, hydroxyethyl acrylate, perfluoroethyl acrylate, isobornyl acrylate, phenoxyethyl acrylate, tetraethylene glycol diacrylate, tripropylene glycol diacrylate, trimethylolpropane triacrylate, and the like. A single acrylate or various combinations of acrylates can be employed in making the copolymers.

Copolymers of the acrylates/methacrylates of the polyether modified polysiloxanes with the organic acrylates can consist of 1 to 99% by weight of the polysiloxanes, preferably 20–90%, and more preferably 50–80% of the polysiloxane.

It is also an objective of the present invention to produce emulsions comprising the polymerized acrylates/methacrylates polyether polysiloxanes copolymers and/or their copolymers with organic acrylates (i.e., latexes), which upon evaporation of water form films with good tactile properties and good integrity. These emulsions can, in fact, be dispersions of the latex.

One particular method to prepare such emulsions comprises:
1. Dispersing an acrylate/methacrylate of polyether polysiloxane copolymers, as defined by Formula I, with or without a separate organic acrylate, using 5–50% by weight of the siloxane, emulsifiers selected from non-ionic surfactants, such as alkylaryl-polyoxyethylene adducts and alkyl ethoxylates, or anionic surfactants, such as carboxylates, sulfates, sulfonates, alkylaryl sulfonates, and alkyl phosphates, to form a stable emulsion containing 10–50% of the dispersed siloxane phase, which can be further stabilized by addition of common thickeners, such as xanthan or guar gum, gelatin, and cellulose derivatives.
2. Adding a free-radical catalyst selected from the group of water soluble or oil soluble peroxides, such as hydrogen peroxide, ammonium persulfate, or potassium persulfate; various organic peroxy catalysts, such as dialkyl peroxides, e.g., diisopropyl peroxide, dilauryl peroxide, di-t-butyl peroxide, or dicumyl peroxide; alkyl hydrogen peroxides, such as t-butyl hydrogen peroxide, t-amyl hydrogen peroxide, or cumyl hydrogen peroxide; diacyl peroxides, such as acetyl peroxide, lauroyl peroxide, or benzoyl peroxide; peroxy esters, such as ethyl peroxybenzoate; or the azo compounds, such as 2-azobis(isobutyronitrile); to the emulsion.
3. Heating the emulsion to or above the temperature necessary for initiating the radical reaction, typically about 40 to about 100° C., depending on the catalyst, for about one to about ten hours, or until the unsaturated groups are consumed.

Alternatively, water-in-oil emulsions, particularly water in polysiloxane emulsions, are prepared by combining water, an anionic surfactant, e.g., sodium dodecyl sulfate, and a free radical catalyst in the aqueous phase and adding the acrylated/methacrylated polyether polysiloxane copolymer, followed by the polysiloxane, and the silicone surfactant to the agitated aqueous phase. The HLB of the anionic surfactant should be relatively high, i.e., above about 15, and the HLB of the silicone surfactant should be between about 4 and 9. Examples of suitable silicone surfactants include, but are not limited to, SILWET L-7622 and SILWET FZ 2108 (available from OSi Specialties, a Crompton Corp. business). The preformed emulsion is heated to at least about 80–90° C. for about 2 to 4 hours. The copolymer should be present at 20–60 wt % of the emulsion and the internal aqueous phase should be present at 5–25 wt % of the emulsion. The polysiloxane should be present at 25–75 wt % of the emulsion. The amount of surfactants will be determined for each case, as necessary.

In a typical application, the acrylated silicone copolymer emulsion was dispersed in an appropriate carrier typically from 0.01% w/w to 50% w/w with 0.1% w/w to 5% w/w being more preferred.

Water is the preferred carrier for most applications, but other carriers, such as alcohol, e.g., methanol, ethanol, propanol, isopropanol, and the like, are also useful in the present invention. The typical level of the liquid carrier is from 99.99% w/w to 50% w/w with 99.9% to 95% w/w being more preferred. The use of an organic carrier offers the added benefit of helping the fabric to dry faster.

A spray dispenser (sprayer) is preferably used to facilitate the treatment of fabrics or substrates, both natural and synthetic, and which can include cotton, linen, wool, silk, rayon, polyester, or blends thereof.

In a typical application, fabric swatches are secured to a backboard and the wrinkle reducing agent, dispersed in an appropriate carrier, is uniformly applied to the fabric substrate from a distance of eight inches. The application is conducted so that up to about 50% by weight of the fabric is wetted with the solution, preferably from about 10% by weight to about 30% by weight. The bottom corners of the fabric are held taut for ten seconds, then allowed to air dry under ambient conditions.

Wrinkle reduction evaluations are carried out under standardized lighting conditions. Two fluorescent 4 ft. type F96 CW (cool white) preheat rapid start lights without baffles were hung 8 feet from the floor and directly over the viewing area and were the only source of light for the viewing board. Observations were made standing directly in front of the specimen, 4 feet away from the viewing board. The degree of wrinkle reduction was made by comparison to an untreated swatch of the same fabric, using a rating assignment of 0=wrinkle free, 1=slightly wrinkled, 2=moderately wrinkled, and 3=heavily wrinkled (same as control).

The advantages and the important features of the present invention will be more apparent from the following examples.

EXAMPLES

Example 1

Wrinkle Reduction Using Silicones in Aqueous Carriers

The wrinkle reduction performance of the organomodified silicones and the emulsion of an acrylated polyether modified polydimethylsiloxane were evaluated in an aqueous formulation. In a typical experiment, 5% by weight of the desired additive (see Table 1) was dissolved or dispersed in water. Thirty percent by weight of the fabric (BWOF) of the resultant sample was spray applied to the fabric swatch and was allowed to dry under ambient conditions. The performances of the various silicone additives were evaluated against (A) a commercial control (Downey with Wrinkle Reduction) and (B) the pure carrier (water). The results are shown in Table 2.

TABLE 1

| ADDITIVE | DESCRIPTION |
| --- | --- |
| C | Emulsion of an acrylated polyether modified polydimethylsiloxane. |
| D | Ethyleneoxy modified trisiloxane. |
| E | Pendant ethyleneoxy, propyleneoxy, modified polydimethylsiloxane. |
| F | Linear, polydimethylsiloxane amino polyalkenoxide copolymer |

Additive C is an emulsion polymerized ABA type acrylated polyethylene glycol modified poly dimethylsiloxane

TABLE 2

| FABRIC | TREATMENT | | | | | |
| --- | --- | --- | --- | --- | --- | --- |
|  | A* | B** | C | D | E | F |
| 100% Cotton | 1.5 | 2.5 | 1 | 2.5 | 1.5 | 1.5 |
| 100% Polyester | 1.5 | 1.75 | 1 | 1 | 1 | 1 |
| 100% Linen | 1.5 | 2 | 1 | 2 | 1.5 | 1.5 |

TABLE 2-continued

|  | TREATMENT | | | | | |
|---|---|---|---|---|---|---|
| FABRIC | A* | B** | C | D | E | F |

A* - Commercial control
B** - Aqueous carrier

Example 2

Performance of Acrylated Polyether Modified Polydimethylsiloxane at Various Concentrations The performance of the acrylated polyether modified polydimethylsiloxane emulsion of Example 1 was evaluated at various concentrations. Dispersions incorporating from 15 to 20% by weight of an emulsion of an acrylated polyether modified polydimethylsiloxane were dispersed in water and spray applied onto fabric and allowed to dry under ambient conditions. The wrinkle reduction results are summarized in Table 3.

TABLE 3

|  | TREATMENT | | | | | |
|---|---|---|---|---|---|---|
| FABRIC | A* | B** | 1% C | 5% C | 10% C | 20% C |
| 100% Cotton | 1 | 3 | 1 | 1 | 1 | 1 |
| 100% Polyester | 1.5 | 3 | 1.25 | 1.25 | 1 | 1 |

A* - Commercial control
B** - Aqueous carrier

Example 3

Softness Evaluation

In addition to wrinkle reduction, the softness of the fabric swatches obtained using the aqueous based formulations were also evaluated at 1% by weight of the desired additive. Softness evaluations were conducted by a hand panel and the tested fabrics were ranked from softest to the harshest using a sliding scale: 8 being the softest and 1 being the harshest. The results are summarized in Table 4.

TABLE 4

|  | TREATMENT | | |
|---|---|---|---|
| FABRIC | A* | B** | C |
| 100% Cotton | 5 | 2 | 6 |
| 100% Linen | 4 | 1 | 4 |
| 100% Silk | 4 | 2 | 6 |

*commercial control
**untreated fabric

Example 4

Effect of Emulsions of Acrylated Polyether Modified Polydimethylsiloxanes on the Staining of Fabric One percent by weight of an emulsion of an acrylated polyether modified polydimethylsiloxane (Additive C of Table 1) was dispersed in water and spray applied onto various fabric substrates and evaluated for staining or spotting of the fabric. The results are summarized in Table 5.

TABLE 5

| SUBSTRATE | OBSERVATIONS |
|---|---|
| 100% Green Silk | No spotting. |
| 100% Black Rayon | No spotting. |
| 100% Blue Wool | No spotting. |

Thus, overall formulations incorporating the emulsion of an acrylated polyether modified polydimethylsiloxane offer superior performance in terms of wrinkle reduction and softness to similar formulations incorporating other silicone additives.

Example 5

Wrinkle Reduction Using Silicones in Non-aqueous Carriers

The wrinkle reduction performance of non-aqueous solutions or dispersions of the additives of Example 1 were also evaluated. In a fashion similar to that described in Example 1, 5 wt % of the desired additive was dissolved or dispersed in ethanol and was spray applied to the fabric swatch (30% BOWF) and was allowed to dry under ambient conditions. The results of the various silicone additives against a partial non-aqueous commercial control (Wrinkle Eraser) are summarized in Table 6.

TABLE 6

|  | TREATMENT | | | | | |
|---|---|---|---|---|---|---|
| FABRIC | A* | B** | C | D | E | F |
| 100% Cotton | 1.5 | 2 | 1.5 | 1.5 | 2 | 2 |
| 100% Linen | 1.5 | 2 | 1.5 | 2 | 2 | 1.5 |
| 100% Polyester | 1.5 | 3 | 1.5 | 1.5 | 1 | 1.5 |

*commercial control
**organic carrier

Example 6

Softness Evaluation

In a manner similar to Example 3, the softness of the fabric swatches using the non-aqueous based formulation were evaluated against an aqueous commercial control at 1% by wt. of desired additive. The results are summarized in Table 7.

TABLE 7

|  | TREATMENT | | |
|---|---|---|---|
| FABRIC | A* | B* | C |
| 100% Cotton | 5 | 2 | 5 |
| 100% Linen | 4 | 1 | 4 |
| 100% Silk | 4 | 2 | 5 |

*commercial control
**untreated fabric

In view of the many changes and modifications that can be made without departing from principles underlying the invention, reference should be made to the appended claims

What is claimed is:

1. A method of reducing wrinkles in fabric comprising the steps of:

A) forming a coating of a carrier and a polymer on a fabric surface, wherein the polymer comprises a polymerized acrylated or methacrylated siloxane having a general formula:

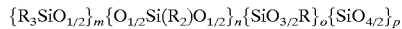

wherein
R is selected from $R^1$ and P;
each $R^1$, which can be the same of different, is a monovalent hydrocarbon group;
each P is $R^3[(C_bH_{2b}O)_zCOCR^4=CH_2]_g$;
$R^3$ is a polyvalent organic moiety;
g is a valency of $R^3$;
$R^4$ is hydrogen or methyl;
b is 2 to 4;
z is 1 to 1000;
m+n+p+o is equal to 1 to 100;
at least one R is P;
n is 1 to 100;
n/o is less than 10:1;
n/p is less than 10:1;
and m is 0 to 10;
B) smoothing the fabric surface; and
C) removing the carrier from the fabric surface.

2. The method of claim 1 wherein the step of removing the carrier from the fabric surface is achieved at ambient temperature.

3. The method of claim 1 wherein the carrier is water.

4. The method of claim 1 wherein the carrier is non-aqueous.

5. The method of claim 4 wherein the non-aqueous carrier is selected from the group consisting of methanol, ethanol, propanol, and isopropanol.

6. The method of claim 1 wherein $R^3$ is a hydroxy substituted alkylene.

7. The method of claim 1 wherein z is 3 to 30.

8. The method of claim 1 wherein m+n+o+p is 2 to 20.

9. The method of claim 1 wherein the acrylated or methacrylated siloxane is of the formula:

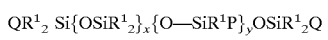

wherein
x and y are each 0 or an integer; and
Q is $R^1$ or P,
provided that the average acrylate functionality is >1 unsaturated group per molecule.

10. The method of claim 9 wherein y is 0 and Q is P.

11. The method of claim 9 wherein g is 1 and $R^3$ is a linear $C_2$–$C_5$ alkylene.

* * * * *